United States Patent
Jang

(10) Patent No.: US 11,182,329 B2
(45) Date of Patent: Nov. 23, 2021

(54) DATA PROCESSING SYSTEM AND OPERATING METHOD THEREOF

(71) Applicant: SK hynix Inc., Gyeonggi-do (KR)

(72) Inventor: Eun-Soo Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/852,606

(22) Filed: Apr. 20, 2020

(65) Prior Publication Data

US 2021/0042257 A1 Feb. 11, 2021

(30) Foreign Application Priority Data

Aug. 6, 2019 (KR) .................. 10-2019-0095418

(51) Int. Cl.
 *G06F 13/42* (2006.01)
(52) U.S. Cl.
 CPC .................. *G06F 13/4234* (2013.01)
(58) Field of Classification Search
 CPC .................................................. G06F 13/4234
 See application file for complete search history.

(56) References Cited

U.S. PATENT DOCUMENTS

| 2013/0073795 | A1* | 3/2013 | Hasegawa | G06F 12/0238 |
| | | | | 711/103 |
| 2018/0107594 | A1* | 4/2018 | Lee | G06F 12/0292 |
| 2019/0129654 | A1* | 5/2019 | Kim | G06F 3/0679 |
| 2019/0138246 | A1* | 5/2019 | Lee | G06F 3/0659 |
| 2019/0140659 | A1* | 5/2019 | Kim | H03M 13/611 |
| 2019/0187900 | A1* | 6/2019 | Byun | G06F 3/064 |

FOREIGN PATENT DOCUMENTS

| KR | 10-2015-0143708 | 12/2015 |
| KR | 10-2019-0013106 | 2/2019 |

* cited by examiner

*Primary Examiner* — Glenn A. Auve
(74) *Attorney, Agent, or Firm* — IP & T Group LLP

(57) ABSTRACT

A method for operating a data processing system including a host and a memory system coupled to each other through a plurality of slots and using a Universal Flash Storage (UFS) interface, the method includes: allocating, by the host, dedicated memory regions respectively corresponding to the slots during a booting operation of the host; communicating, between the host and the memory system in parallel through the slots based on command packets and address information for data buffer regions, the command packets and the address information being stored in the dedicated memory regions; and deallocating, by the host, the dedicated memory regions during a shutdown of the host.

20 Claims, 13 Drawing Sheets

DATA PROCESSING SYSTEM AND OPERATING METHOD THEREOF

CROSS-REFERENCE TO RELATED APPLICATION

The present application claims priority of Korean Patent Application No. 10-2019-0095418, filed on Aug. 6, 2019, which is incorporated herein by reference in its entirety.

BACKGROUND

1. Field

Various embodiments of the present invention relate to a data processing system, and more particularly, to a data processing system that may improve throughput between a host and a memory system, and a method for operating the data processing system.

2. Description of the Related Art

Recently, the computer environment paradigm is transitioning to ubiquitous computing, which allows users to access computer systems anywhere anytime. As a result of this paradigm shift, the use of portable electronic devices, such as mobile phones, digital cameras, and laptop computers has been increasing. Such portable electronic devices may use a memory system which generally uses a memory device, in other words, a data storage device. The data storage device may be used as a main memory device or an auxiliary memory device of a portable electronic device.

A data storage device using a memory device is advantageous in that it has excellent stability and durability with high data access rate and low power consumption because there is no mechanical driving part. As an example of the memory system having such advantages, the data storage device may include a USB (Universal Serial Bus) memory device, a memory card having diverse interfaces, a solid state drive (SSD), and the like.

SUMMARY

Embodiments of the present invention are directed to a data processing system that may use in parallel a plurality of slots coupling a host and a memory system by allocating an exclusive memory space for storing command information.

In accordance with an embodiment of the present invention, a method for operating a data processing system including a host and a memory system coupled to each other through a plurality of slots and using a Universal Flash Storage (UFS) interface, the method includes: allocating, by the host, dedicated memory regions respectively corresponding to the slots during a booting operation of the host; communicating, between the host and the memory system in parallel through the slots based on command packets and address information for data buffer regions, the command packets and the address information being stored in the dedicated memory regions; and deallocating, by the host, the dedicated memory regions during a shutdown of the host.

In accordance with another embodiment of the present invention, a method for operating a data processing system including a host and a memory system coupled to each other through a plurality of slots and using a Universal Flash Storage (UFS) interface, the method includes: allocating, by the host, dedicated memory regions respectively corresponding to the slots based on sizes of transfer requests stored in a register; communicating between the host and the memory system in parallel through the slots based on command packets respectively stored in the dedicated memory regions and address information for data buffer regions; and deallocating, by the host, the dedicated memory regions based on the sizes of the transfer requests.

In accordance with yet another embodiment of the present invention, a data processing system using a Universal Flash Storage (UFS) interface, comprising: a memory system; a processor suitable for allocating metadata regions and data buffer regions respectively corresponding to the metadata regions for a plurality of slots in a booting process, and storing address information for the data buffer regions in the corresponding metadata regions; a command manager suitable for generating command packets respectively corresponding to a plurality of transfer requests and storing the command packets in corresponding ones among the metadata regions; and a host controller suitable for communicating in parallel with the memory system through the slots based on the command packets and the address information for the data buffer regions, wherein the memory system and the host controller are coupled to each other through the slots and use the UFS interface.

In accordance with another embodiment of the present invention, an operating method of a host, the operating method includes: allocating, when booted, pairs of first and second memory regions, the pairs respectively corresponding to slots; storing, in a selected one of the second memory regions, a command and address indicating a selected one of the first memory regions, the selected pair of first and second memory regions corresponding to a selected one of the slots; requesting, through the selected slot, a memory system to perform an operation by providing the memory system with the command from the selected second memory region; storing, when the command is a read command, read data as a result of the operation in the selected first memory region; and deallocating the pair of first and second memory regions when the host is shut down, wherein, when the command is a program command, the storing includes storing program data in the selected first memory region and the requesting includes providing the memory system with the program data from the selected first memory region.

DETAILED DESCRIPTION

Figure 1:
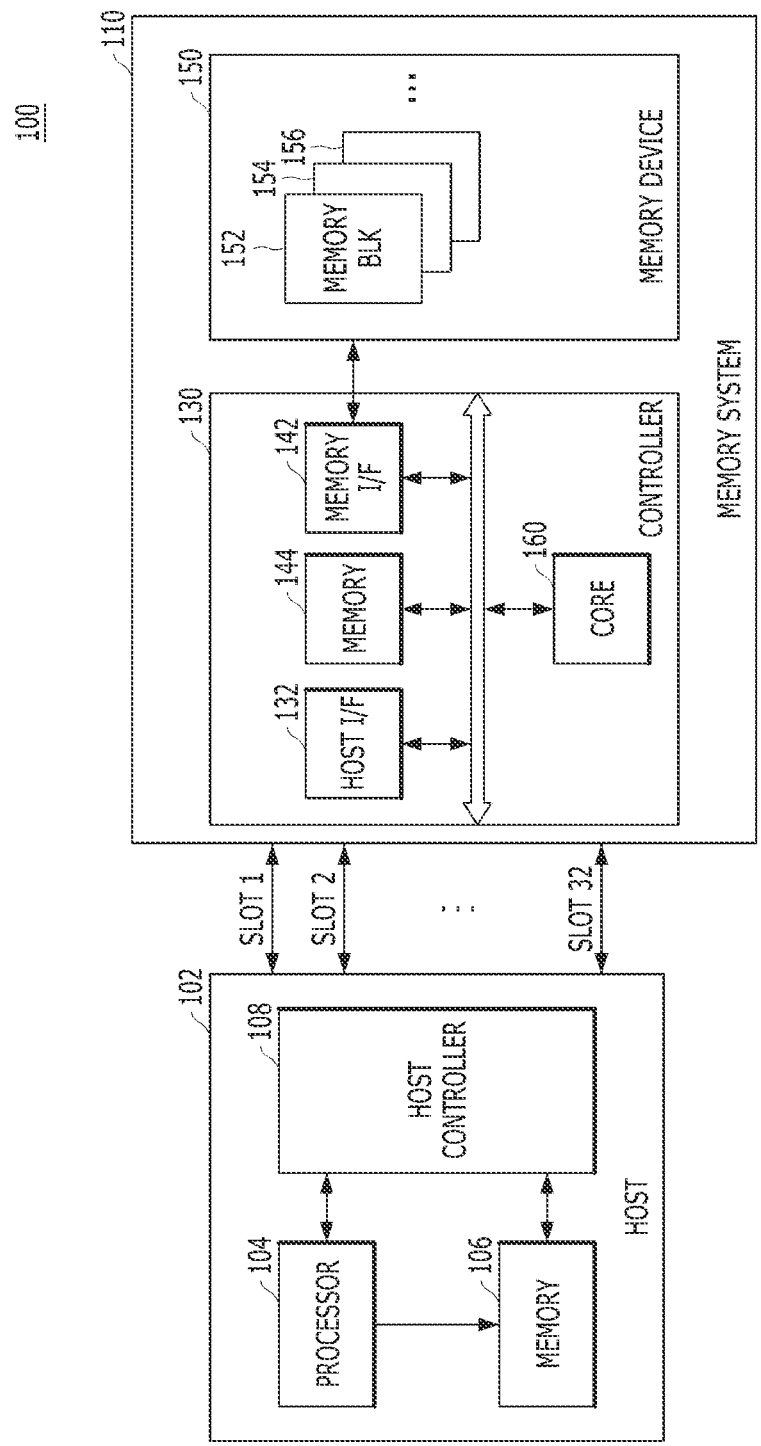
FIG. 1 is a block diagram schematically illustrating an example of a data processing system including a memory system in accordance with an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Embodiments of the present invention are described in detail below with reference to the accompanying drawings.

FIG. 1 is a block diagram schematically illustrating an example of a data processing system 100 including a memory system in accordance with an embodiment of the present invention.

Referring to FIG. 1, the data processing system 100 may include a host 102 and a memory system 110.

The host 102 may include a processor 104, a memory 106, and a host controller 108.

The host 102 may configured as any of various wired and wireless electronic devices, such as any portable electronic device, e.g., mobile phone, MP3 player, laptop computer, or as any non-portable electronic device, e.g., desktop computer, game player, TVs, projector.

The processor 104 may include at least one operating system (OS) and may execute the operating system(s) to perform an operation with the memory system 110 according to a user request. The processor 104 may generate a plurality of commands corresponding to the user request, and the memory system 110 may perform operations corresponding to the commands, i.e., operations corresponding to the user request. The operating system(s) may generally manage and control the function and operation of the host 102 and provide operations between the host 102 and a user using the data processing system 100 or the memory system 110.

The processor 104 may control the memory system 110 to perform a program operation and a read operation by executing software for controlling the program operation and the read operation of the memory system 110. For example, the processor 104 may generate a transfer request for the program operation and the read operation, information for various commands and program data in case of a program request.

The memory 106 may store data for driving the host 102 and the memory system 110. The memory 106 may include a data buffer that stores program data and read data. The processor 104 may store various types of information on a command generated in the memory 106. For example, the memory 106 may store information on the type of a command, address information of the data buffer, information on the size of data associated with the command, and the like.

The host controller 108 may generate a command packet CMD based on the transfer request and the various types of information on a command. The host controller 108 may store the generated command packet CMD in the memory 106. Also, the host controller 108 may control the memory system 110 to transfer the generated command packet CMD to the memory system 110 and to perform operations corresponding to the user request.

According to an embodiment of the present invention, the host 102 and the memory system 110 may transfer/receive data through a plurality of slots. For example, the host 102 and the memory system 110 may be coupled to each other through 32 slots, and may transfer/receive data in parallel through the 32 slots.

The memory system 110 may operate in response to a request from the host 102 and, in particular, may store data accessed by the host 102. The memory system 110 may be used as a main memory or an auxiliary memory of the host 102. The memory system 110 may be realized as any of various types of storage devices, e.g., Solid State Drive (SSD), MMC, eMMC (embedded MMC) and the like, according to a host interface protocol for connection with the host 102.

Storage devices realizing the memory system 110 may include a volatile memory device such as a Dynamic Random Access Memory (DRAM), or Static Random Access Memory (SRAM), and a non-volatile memory device such as a Read Only Memory (ROM), a Mask ROM (MROM), a Programmable ROM (PROM), an Erasable ROM (EPROM), an Electrically Erasable ROM (EEPROM), a Ferromagnetic ROM (FRAM), a Phase Change RAM (PRAM), a Magnetic RAM (MRAM), a Resistive RAM (RRAM), or a flash memory.

The memory system 110 may include a memory device 150 and a controller 130.

The controller 130 and the memory device 150 may be integrated into one semiconductor device. For example, the controller 130 and the memory device 150 may be so integrated to form an SSD, a Personal Computer Memory Card International Association (PCMCIA: PC card), an SD card (SD, miniSD, microSD, SDHC) a Universal Flash Storage device (UFS) or the like. Also, as another example, the memory system 110 may form, e.g., a computer, a smart phone, a portable game player, among constituent elements that form a computing system.

When configured as a nonvolatile memory, the memory device 150 may retain stored data even when power is not supplied. In particular, the memory device 150 may store the data provided from the host 102 through a program operation, and provide the host 102 with the data stored through a read operation. The memory device 150 may include a plurality of memory blocks 152, 154 and 156, each of which may include a plurality of pages. Each of the pages may include a plurality of memory cells that are coupled to a plurality of word lines WL. Also, the memory device 150 may also include a plurality of memory dies, each of which includes a plurality of planes, each of which includes a plurality of memory blocks 152, 154 and 156. The memory device 150 may be a non-volatile memory device, e.g., a flash memory, which may be a three-dimensional stereoscopic stack structure.

The controller 130 may control the memory device 150 in response to a request from the host 102. For example, the controller 130 may provide the host 102 with data read from the memory device 150, store data provided from the host 102 in the memory device 150, and control the memory device 150 to perform a program operation and an erase operation.

To be more specific, the controller 130 may include a host interface (HOST I/F) 132, a core 160, a memory interface (MEMORY I/F) 142, and a memory 144.

The host interface 132 may process commands and data of the host 102, and the host interface 132 may be formed to communicate with the host 102 based on at least one protocol among diverse interface protocols, such as USB (Universal Serial Bus), SATA (Serial Advanced Technology Attachment), SCSI (Small Computer System Interface), ESDI (Enhanced Small Disk Interface) and the like. Herein, the host interface 132 may serve to exchange data with the host 102, and the host interface 132 may be driven based on firmware which is called a Host Interface Layer (HIL).

The memory interface 142 may be a memory/storage interface that performs interfacing between the controller 130 and the memory device 150 to enable the controller 130 to control the memory device 150 in response to a request from the host 102.

The memory 144 may be an operation memory of the memory system 110, and the controller 130 and the memory 144 may store data for driving the memory system 110 and the controller 130.

The memory 144 may be realized as a volatile memory, for example, a Static Random Access Memory (SRAM) or a Dynamic Random Access Memory (DRAM). The memory 144 may be within the controller 130 or external to the controller 130. In the latter case, the memory 144 may be realized as an external volatile memory which exchanges data with the controller 130 through a memory interface.

The memory 144 may store the data needed for performing operations such as a program operation and a read operation between the host 102 and the memory device 150, and the data produced while an operation, such as a program operation and a read operation, is performed. The memory 144 may be a program memory, a data memory, a write buffer/cache, a read buffer/cache, a data buffer/cache, a map buffer/cache, or the like.

The core 160 may control the overall operation of the memory system 110 and, in particular, the core 160 may control a program operation or a read operation that is performed on the memory system 110 in response to a program request or a read request applied from the host 102. Herein, the core 160 may drive firmware called a Flash Translation Layer (FTL) in order to control the general operations of the memory system 110. The core 160 may be realized as a microprocessor or a central processing unit (CPU).

The controller 130 may perform an operation requested by the host 102 in the memory device 150 through the core 160. The controller 130 may also perform a background operation for the memory device 150 through the core 160. The background operation for the memory device 150 may be any of various operations, including a garbage collection (GC) operation, a wear leveling (WL) operation, a map flush operation, and/or a bad block management operation.

Figure 2:
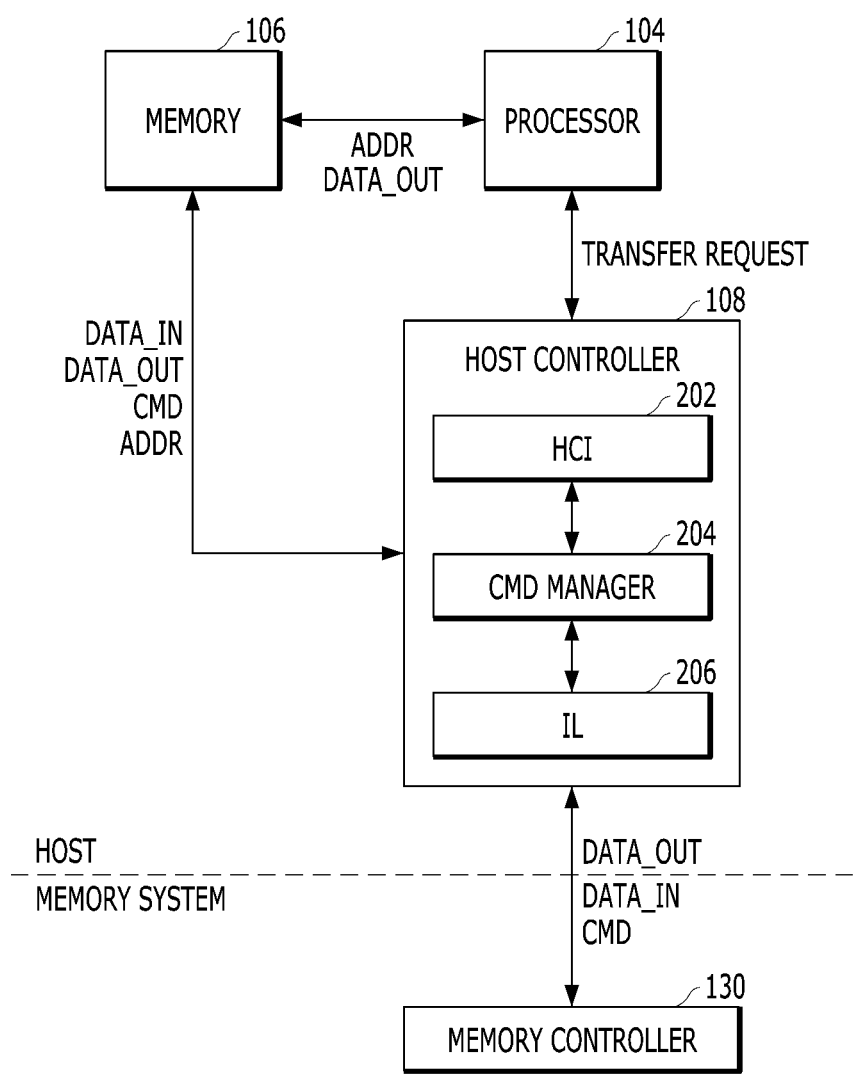
FIG. 2 is a block diagram illustrating a detailed structure of a host, such as that shown in FIG. 1.

FIG. 2 is a block diagram illustrating a detailed structure of the host shown in FIG. 1.

According to an embodiment of the present invention, the host 102 and the memory system 110 may perform communication based on a Universal Flash Storage (UFS) interface. The processor 104 may generate a transfer request for a program operation and a read operation and provide the host controller 108 with the transfer request. When the processor 104 generates a transfer request for a program operation, the processor 104 may generate program data DATA_OUT and provide the memory 106 with the program data DATA_OUT. The processor 104 may allocate, in the memory 106, a metadata region corresponding to each of a plurality of slots, which couples the host 102 and the memory system 110. The processor 104 may allocate, in the memory 106, a data buffer region corresponding to the metadata region, and store the program data DATA_OUT in the data buffer region. The processor 104 may store address information ADDR for the data buffer region in the metadata region.

The host controller 108 may include a host controller interface (HCI) 202, a command manager 204, and an interconnect layer (IL).

The host controller interface 202 may store a transfer request provided from the processor 104 in a register and transfer the same to the command manager 204. Also, the host controller interface 202 may transfer the program data DATA_OUT and address information ADDR for the data buffer region that are stored in the memory 106 to the interconnect layer 206. The host controller interface 202 may store read data DATA_IN provided from the memory system 110 in the memory 106, and store the command packet CMD generated from the command manager 204 in the metadata region of the memory 106.

The command manager 204 may generate a command packet CMD based on a transfer request stored in a register of the host controller interface 202. The command packet CMD may include information on the type of a command and the size of target data, and a header region of the command packet CMD may include a spare region. Also, the command manager 204 may provide the interconnect layer 206 with the command packet CMD.

The interconnect layer 206 may communicate with the controller 130. The interconnect layer 206 may provide the controller 130 with the command packet CMD and the program data DATA_OUT based on the address information ADDR for the data buffer region. The interconnect layer 206 may receive read data DATA_IN that are provided from the controller 130 based on the address information ADDR for the data buffer region.

Figure 3:
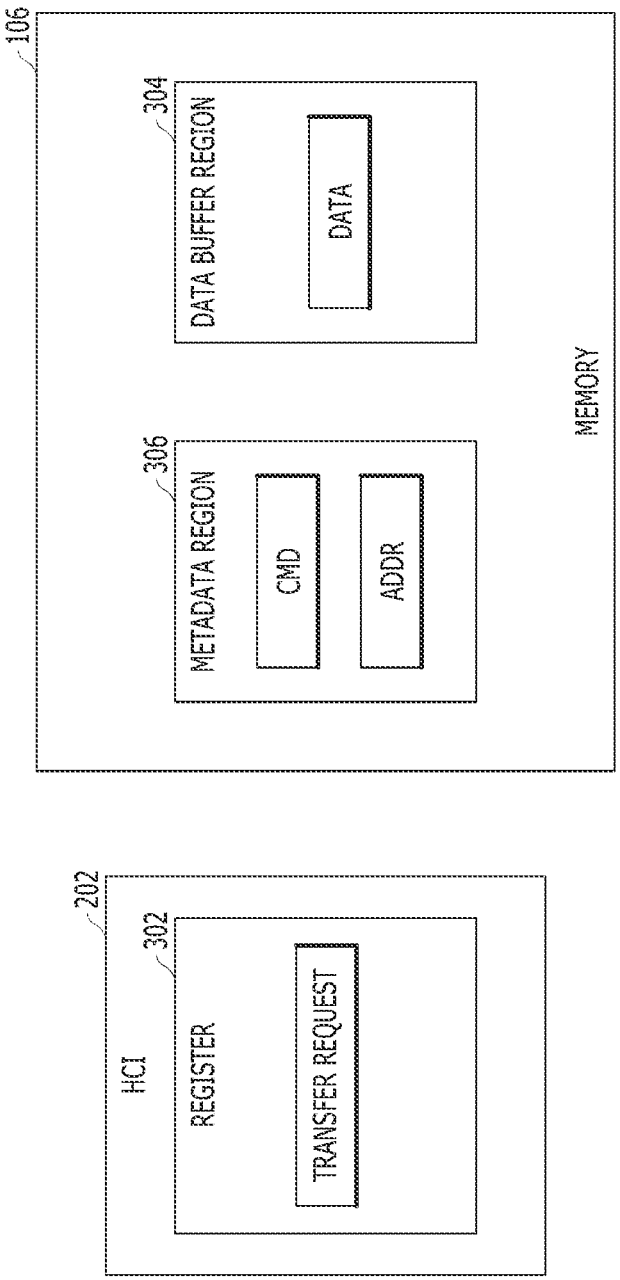
FIG. 3 is a block diagram illustrating a region allocated in a host memory and information stored in the region.

FIG. 3 is a block diagram illustrating a region allocated in a host memory, e.g., memory 106, and information stored in the region.

The host controller interface 202 may include a register 302. The register 302 may store a transfer request, and the transfer request may include various commands and parameters.

The memory 106 may include a metadata region 306 and a data buffer region 304 corresponding to the metadata region 306. FIG. 3 illustrates the metadata region 306 corresponding to one slot, and although not illustrated, there may be metadata regions 306 respectively corresponding to a plurality of slots, e.g., SLOT1 to SLOT32, coupling the host 102 and the memory system 110. The metadata region 306 may store a command packet CMD and address information ADDR for the data buffer region. The address information ADDR for the data buffer region may be a physical address indicating the data buffer region 304, and may be stored in the metadata region 306 for accessing the data buffer region 304. The metadata region 306 and the corresponding data buffer region 304 may respectively store the command packet CMD and the corresponding data. The metadata region 306 and the corresponding data buffer region 304 may correspond to one of the plurality of slots SLOT1 to SLOT32.

Figure 4:
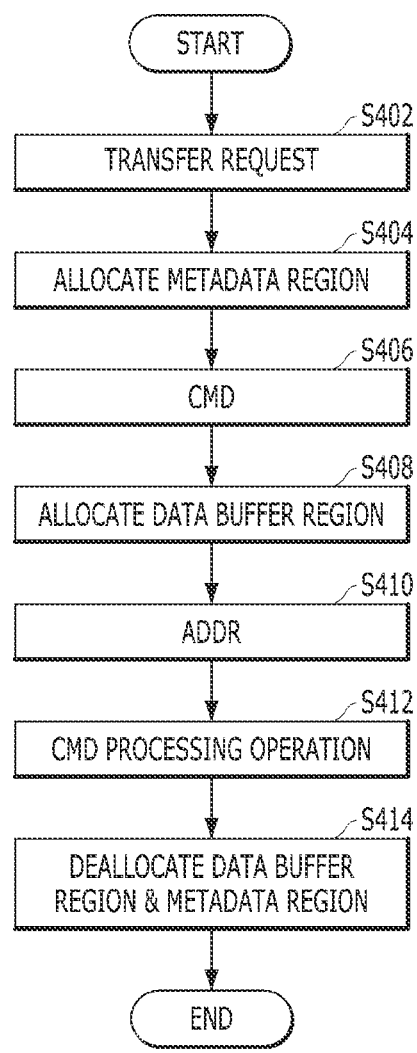
FIG. 4 is a flowchart describing an operation of processing a transfer request according to the prior art.

FIG. 4 is a flowchart describing an operation of processing a transfer request according to the prior art.

In step S402, a processor of a host may generate a transfer request and store the generated transfer request in a register of a memory.

In step S404, the processor may allocate a a metadata region in the memory in response to the transfer request generated in step S402. The processor may determine a size of the metadata region to be allocated based on the transfer request.

In step S406, a command manager of the host may generate a command packet CMD based on the transfer request stored in the register. The command manager may store the generated command packet CMD in the metadata region allocated in step S404.

In step S408, the processor may allocate, in the memory, a data buffer region corresponding to the metadata region allocated in step S404. The data buffer region may be a space for storing program data to be provided to a memory system coupled to the host and read data provided from the memory system.

In step S410, the processor may store address information ADDR for the data buffer region allocated in step S408 in the metadata region allocated in step S404.

In step S412, a host controller may perform a command processing operation based on the command packet CMD generated in step S406 and the address information ADDR for the data buffer region generated in step S410. To be specific, the host controller may control the memory system to provide it with the command packet CMD and to perform an operation corresponding to the transfer request. For example, in case of a program operation, the host controller may provide the memory system with the command packet CMD and program data stored in the data buffer region, and the memory system may program the program data in a memory block based on the provided command packet CMD. Also, in case of a read operation, the host controller may provide the memory system with the command packet CMD, and the memory system may perform a read operation in response to the provided command packet CMD and then provide the host with read data.

Figure 5:
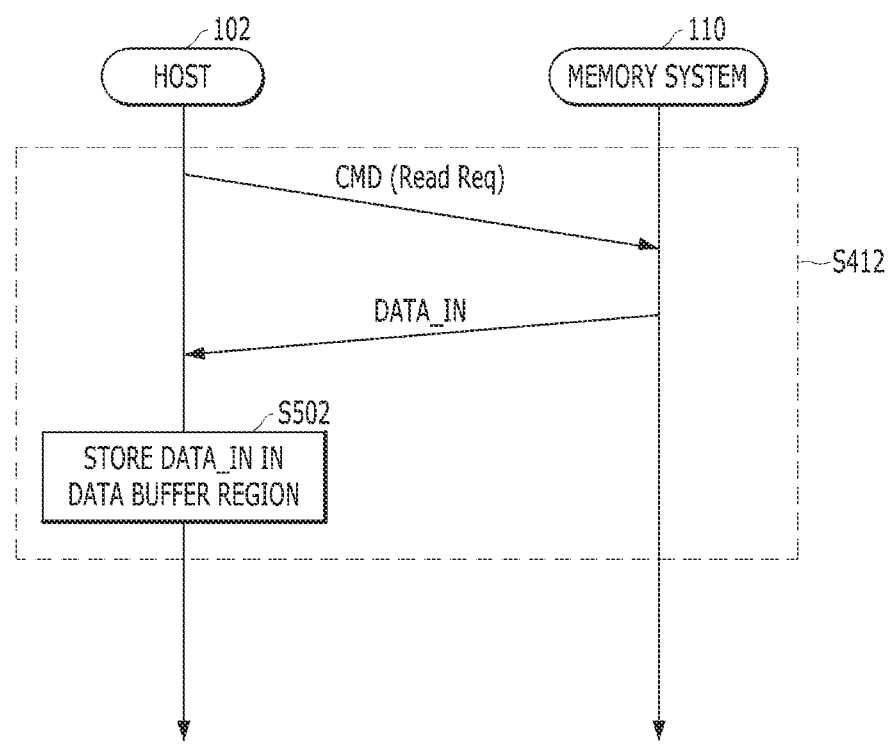
FIG. 5 is a flowchart describing a read operation among command processing operations.

FIG. 5 is a flowchart describing a read operation among command processing operations.

The step S412 may include step S502, and the host 102 may provide the memory system 110 with a command packet CMD. The command packet CMD may correspond to a read request. The memory system 110 may perform a read operation based on the command packet CMD and provide the host 102 with read data DATA_IN. In step S502, the host 102 may store the provided read data DATA_IN in the data buffer region 304 based on the address information ADDR for the data buffer region.

Figure 6:
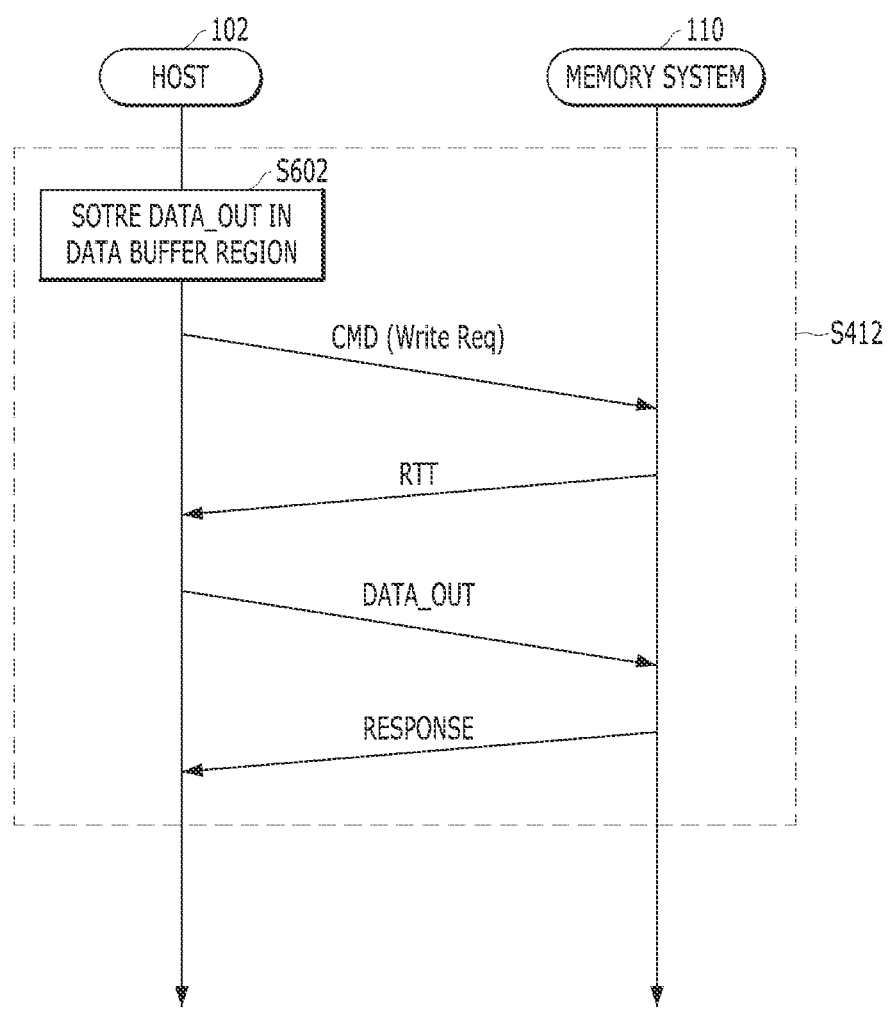
FIG. 6 is a flowchart describing a program operation among command processing operations.

FIG. 6 is a flowchart describing a program operation among command processing operations.

The step S412 may include step S602, in which the host 102 may store program data DATA_OUT in a data buffer region 304. The host 102 may provide the memory system 110 with a command packet CMD. When the host 102 and the memory system 110 communicate with each other based on the UFS interface, and when there is enough space to store the program data DATA_OUT, the memory system 110 may provide the host 102 with a Ready To Transfer (RTT) signal. The host 102 may provide the memory system 110 with the program data DATA_OUT in response to the RTT signal, and the memory system 110 may provide the host 102 with a response signal RESPONSE after the programming of the program data DATA_OUT into a memory block is completed.

Referring back to FIG. 4, in step S414, the processor may deallocate the metadata region and the data buffer region that are respectively allocated in steps S404 and S408. As described earlier with reference to steps S402 to S414, according to the prior art, an operation of allocating the metadata region and a data buffer region for a single transfer request and an operation of deallocating or releasing the allocated metadata region and data buffer region after processing of a command operation are performed. Therefore, whenever a transfer request is generated, an operation of allocating a region for processing the transfer request in the memory and an operation of deallocating or releasing the region are repeatedly performed.

Figure 7:
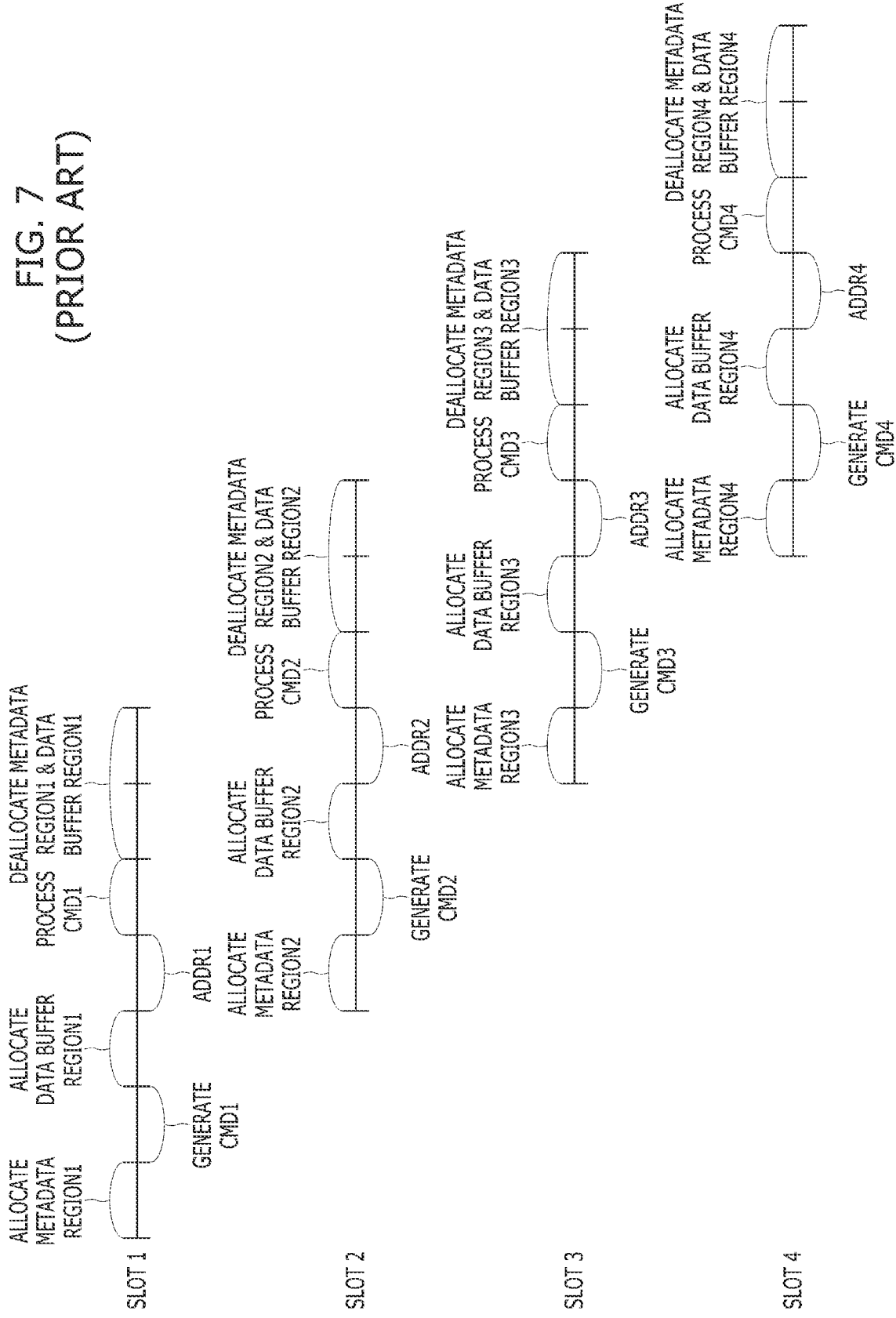
FIG. 7 illustrates a problem when processing a transfer request according to the prior art.

FIG. 7 illustrates a problem when processing a transfer request according to the prior art.

FIG. 7 illustrates an example of processing a transfer request for each of four slots.

When the processor generates a first transfer request, a first metadata region corresponding to a first slot SLOT1 may be allocated in the memory. The command manager may generate a first command packet CMD1 based on the first transfer request. The processor may allocate a first data buffer region corresponding to the first metadata region in the memory.

When the first metadata region and the first data buffer region are allocated in the memory, the processor may allocate a second metadata region corresponding to a slot SLOT2 in response to a second transfer request in the memory while generating address information ADDR1 for the first data buffer region.

The host controller may perform a first command processing operation based on the first command packet CMD1 and the address information ADDR1 for the first data buffer region. When the first command processing operation is completed, the processor deallocates the first metadata region and the data buffer region. While the host controller performs the command processing operation and the processor deallocates the first metadata region and the data buffer region, the processor may generate a second command packet CMD2 and allocate the second data buffer region in the memory. In the same manner, when the second metadata region and the second data buffer region are allocated, the processor may allocate a third metadata region corresponding to a third slot SLOT3 in the memory in response to a third transfer request while generating address information ADDR2 for the second data buffer region. The processor and the host controller may process a fourth transfer request in the same manner as described above.

According to the prior art, the host may generate a metadata region and a data buffer region whenever an individual transfer request is generated. When the command processing operation is completed, the host may deallocate the metadata region and the data buffer region. Therefore, it takes time to generate the metadata region and the data buffer region and time to deallocate the metadata region and the data buffer region in order to process the individual transfer request. Also, when it takes a long time to generate the metadata region and the data buffer region according to the performance of the host, the operation of generating the metadata region and the data buffer region for the subsequent slot may be delayed, and a transfer request processing operation may not be performed simultaneously on a plurality of slots coupling the host and the memory system. When an idle slot occurs, the throughput of the data processing system may decrease because the number of commands that the memory system may receive from the host may decrease.

According to an embodiment of the invention, while the host 102 is booted, the processor 104 may allocate a metadata region and a data buffer region corresponding to each of the slots coupling the host 102 and the memory system 110 in advance. Also, the processor 104 may use the allocated metadata region and the data buffer region as dedicated memory regions for processing the transfer request without deallocating or releasing the allocated metadata region and the data buffer region whenever a command processing operation for an individual transfer request is completed. The processor 104 may deallocate the allocated metadata region and the data buffer region in the process of shutting down the host 102. Accordingly, the processor 104 may not allocate and deallocate the metadata region and the data buffer region each time in order to process the transfer request, and perform a command processing operation on a plurality of slots in parallel. As a result, the throughput of the data processing system 110 may be improved.

Figure 8:
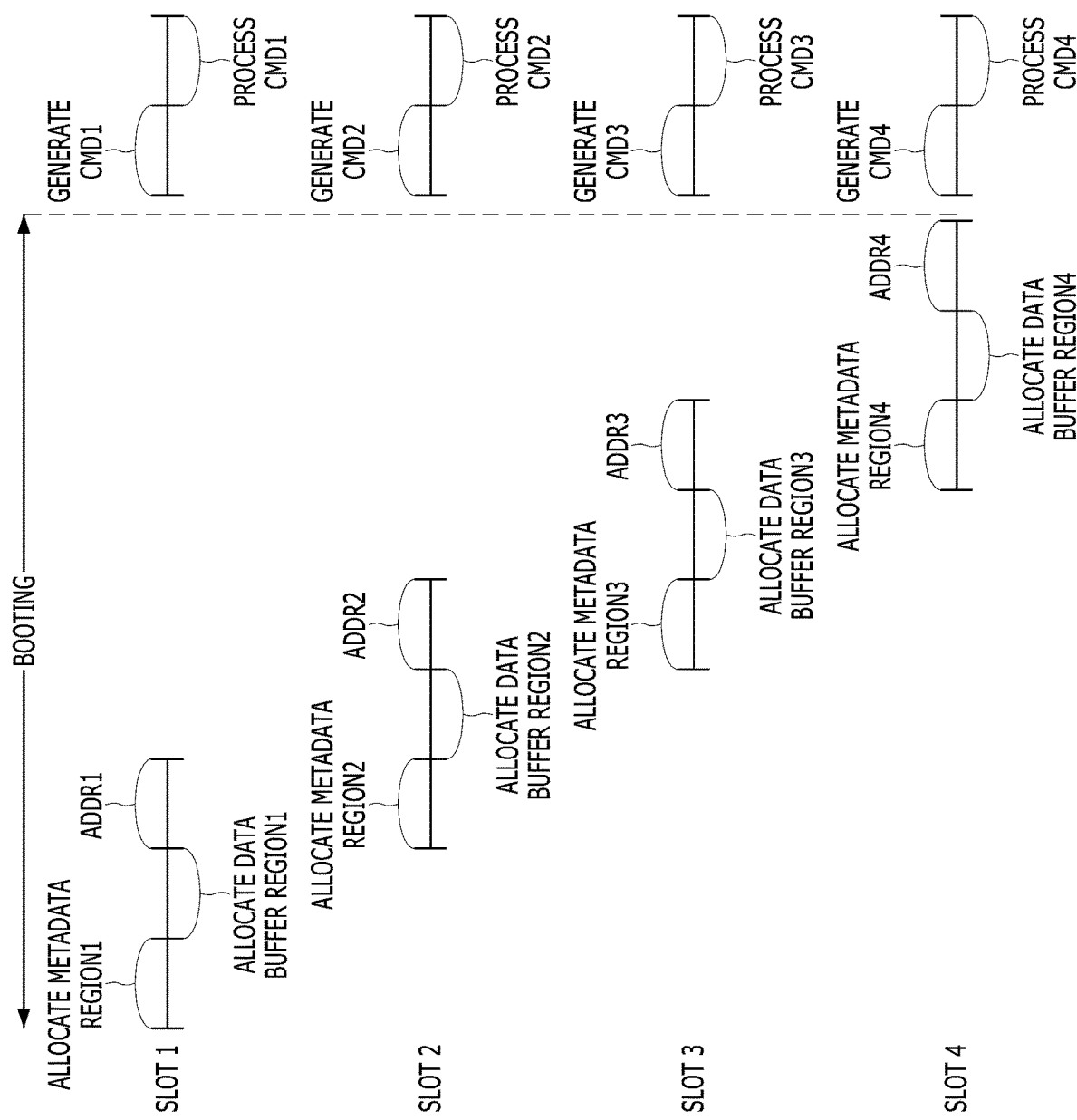
FIG. 8 illustrates a case of processing a transfer request for each of multiple slots.

FIG. 8 illustrates a case of processing a transfer request for each of four slots. The number of slots, however, is not limited to four.

The processor 104 may allocate first to fourth metadata regions and first to fourth data buffer regions that respectively correspond to the first to fourth slots SLOT1 to SLOT4 while the host 102 is booted. Also, the processor 104 may generate address information ADDR1 to ADDR4 for the first to fourth data buffer regions while the host 102 is booted.

When the booting operation is completed, the metadata region and the data buffer region are allocated for each of the slots SLOT1 to SLOT4 and the address information ADDR1 to ADDR4 are generated respectively for the data buffer regions, the command manager 204 may generate a command packet CMD in response to a transfer request, and the host controller 108 may perform a command processing operation based on the command packet CMD and the address information ADDR on the data buffer region. According to an embodiment of the present invention, during the booting operation, a metadata region and a data buffer region for each of a plurality of slots coupling the host 102 and the memory system 110 may be allocated and the address information ADDR on the data buffer region may be generated. The allocated metadata region and the data buffer region for each of the slots are served as dedicated memory regions within the memory 106. Therefore, since the address information ADDR on the data buffer region is not changed, the address information ADDR on the data buffer region generated in the booting operation may be used for the subsequent transfer request without deallocation. The data corresponding to different transfer requests may have the same address information ADDR for the data buffer region corresponding to the same slot until the host 102 is shut down. Also, whenever the transfer request is changed, the information on the changed transfer request may be overwritten in the allocated metadata region and data buffer region. When the host 102 is shut down, the metadata region and data buffer region may be deallocated.

According to an embodiment of the present invention, since the operation of allocating a metadata region, the operation of allocating a data buffer region, the operation of generating address information ADDR on the data buffer region, the operation of deallocating a metadata region, and the operation of deallocating a data buffer region are not performed for each transfer request, the time required for processing the transfer request may be reduced. Also, since the metadata region and the data buffer region are allocated in advance during the booting process, a command packet generation operation and a command processing operation may be simultaneously performed for a plurality of slots, thereby increasing the throughput of the data processing system 110.

Figure 9:
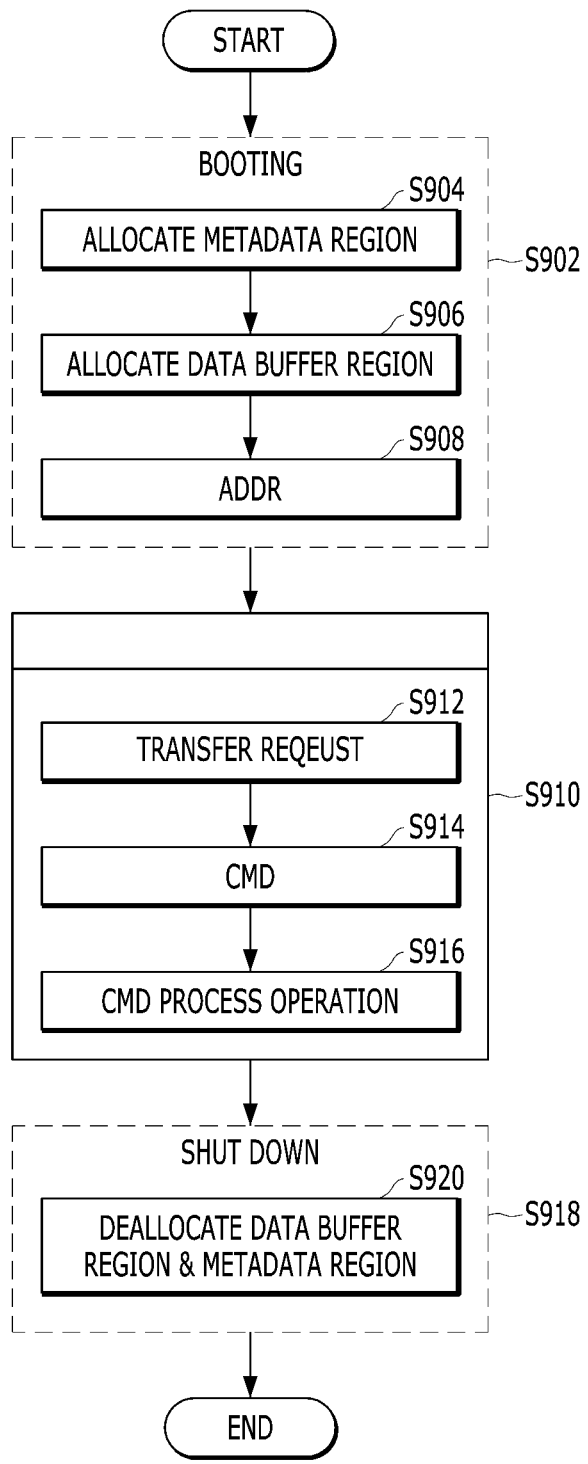
FIG. 9 is a flowchart describing a method of operating a data processing system in accordance with an embodiment of the present invention.

FIG. 9 is a flowchart describing a method of operating the data processing system 110 in accordance with an embodiment of the present invention.

In step S902, the host 102 may perform a boot operation, which may include steps S904, S906, and S908. To be specific, while the host 102 is booted, the processor 104 may perform steps S904, S906, and S908.

In step S904, the processor 104 may allocate a metadata region corresponding to each of a plurality of slots. According to an embodiment of the present invention, the processor 104 may allocate a metadata region corresponding to each of the slots in such a manner that each metadata region is as large in size as can be accommodated.

In step S906, the processor 104 may allocate a data buffer region for each metadata region allocated in step S904. According to an embodiment of the present invention, the processor 104 may allocate a data buffer region corresponding to each metadata region so that the size of each data buffer region is as large as possible.

In step S908, the processor 104 may generate address information ADDR indicating each data buffer region generated in step S906. The processor 104 may store the generated address information ADDR on the data buffer region in the corresponding metadata region. The processor 104 may use a meta-data indicating data stored in the buffer region when performing a command process operation.

Figure 10:
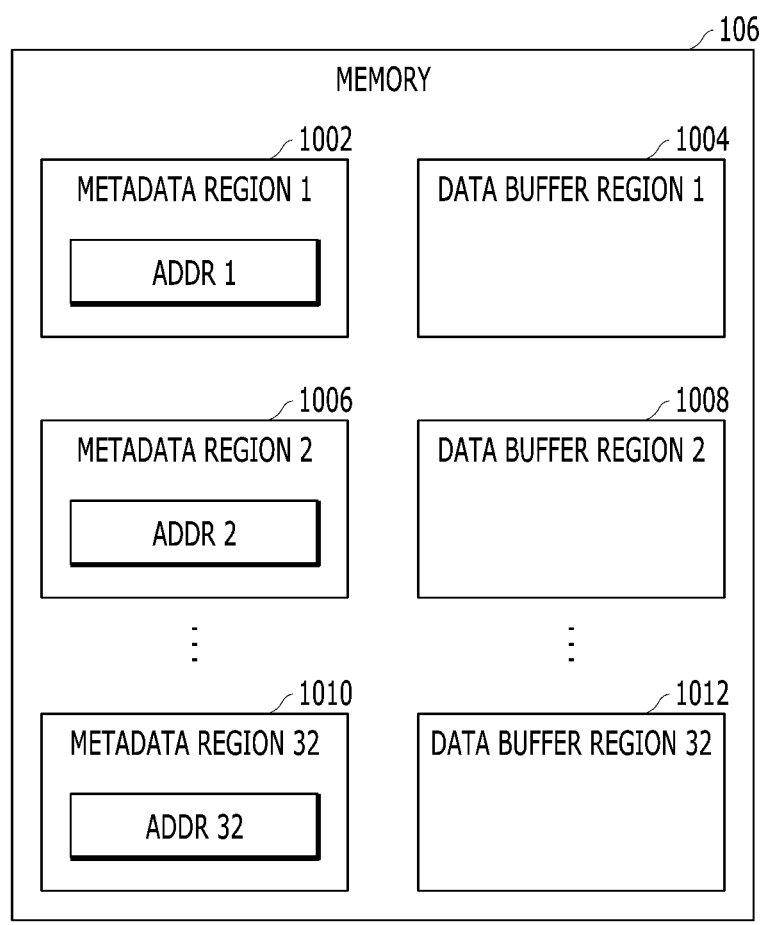
FIG. 10 is a block diagram illustrating a region allocated in a memory immediately after a boot operation is completed in accordance with an embodiment of the present invention.

FIG. 10 is a block diagram illustrating a region allocated in a memory, e.g., memory 106, immediately after a boot operation is completed in accordance with an embodiment of the present invention.

As described above with reference to FIG. 9, the processor 104 may allocate a metadata region for each of a plurality of slots coupling the host 102 and the memory system 110 in the memory 106 during a boot operation. The data buffer regions corresponding to the metadata regions may be allocated in the memory 106. Also, the processor 104 may store the address information ADDR on the data buffer region in the corresponding metadata region. In case of the data processing system 100 using the UFS interface, there may be 32 slots. Immediately after the booting operation is completed, first to $32^{nd}$ metadata regions 1002 to 1010 respectively corresponding to the 32 slots may be allocated in the memory 106 as shown in FIG. 10. Also, first to $32^{nd}$ data buffer regions 1004 to 1012 respectively corresponding to the first to $32^{nd}$ metadata regions 1002 to 1010 may be allocated. Address information ADDR1 to ADDR32 on the first to $32^{nd}$ data buffer regions 1004 to 1012 may be stored in the first to $32^{nd}$ metadata regions 1002 to 1010, respectively.

Referring back to FIG. 9, in step S912, the processor 104 may generate a transfer request. The processor 104 may designate a slot, among the 32 slots, corresponding to the transfer request and store the generated transfer request in the register 302.

In step S914, the command manager 204 may generate a command packet CMD based on the transfer request which is generated in the step S912. The command manager 204 may store the generated command packet CMD in a corresponding metadata region among the metadata regions allocated in step S902. According to an embodiment of the present invention, since the paired metadata regions and the data buffer regions respectively corresponding to the slots are allocated in advance in step S902, when a plurality of transfer requests are stored in the register 302, the command The manager 204 may simultaneously generate command packets CMD respectively corresponding to the slots.

In step S916, the host 102 and the memory system 110 may perform a command processing operation based on the command packet CMD generated in step S914. As described above with reference to FIGS. 5 and 6, when the type of the command is a program command, the command processing operation may include storing program data in one of the allocated data buffer regions and providing the memory system 110 with the program data to be programmed in a memory block. Also, when the type of the command is a read command, the command processing operation may include reading data from a memory block, providing the host 102 with the read data, and storing the read data in one of the allocated data buffer regions. According to an embodiment of the present invention, when the command packets CMD respectively corresponding to the slots are simultaneously generated in step S914, the host 102 and the memory system 110 may perform plural command processing operations by simultaneously using the plural slots. Therefore, the throughput of the data processing system 110 may be improved by performing the command processing operation.

Figure 11:
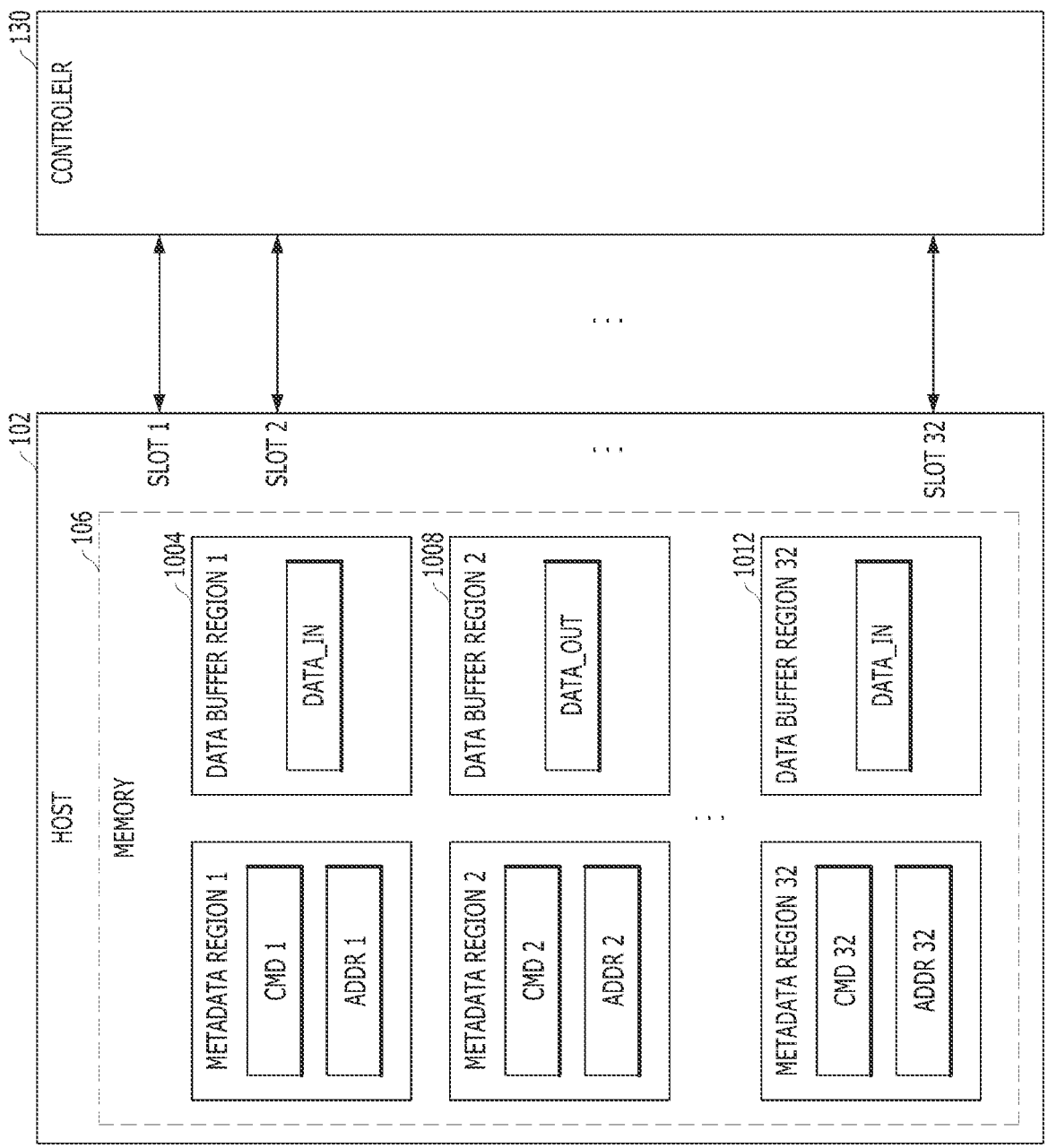
FIG. 11 is a block diagram illustrating various types of information stored in a host while performing a command processing operation in accordance with an embodiment of the present invention.

FIG. 11 is a block diagram illustrating various types of information stored in a host, e.g., host 102, while performing a command processing operation in accordance with an embodiment of the present invention.

In step S914, the command manager 204 may store a command packet CMD in a pre-allocated metadata region. As illustrated in FIG. 11, when the host 102 and the controller 130 are coupled to each other through the 32 slots, the memory 106 may include first to $32^{nd}$ metadata regions UTRD1 to UTRD32 corresponding to the 32 slots, respectively, and the command manager 204 may store first to $32^{nd}$ command packets CMD1 to CMD32 in the first to $32^{nd}$ metadata regions UTRD1 to UTRD32, respectively. The host controller 108 may simultaneously provide the controller 130 with the first to $32^{nd}$ command packets CMD1 to CMD32 through the 32 slots. When the type of the command in the first command packet CMD1 is a read command, read data DATA_IN may be stored in the first data buffer region DATA BUFFER1. When the type of the command included in the second command packet CMD2 is a program command, program data DATA_OUT may be stored in the second data buffer region DATA BUFFER2.

Referring back to FIG. 9, in step S910, the host 102 and the memory system 110 may repeatedly perform the operations of steps S912 to S916 by using dedicated memory regions which are allocated in advance in step S902. The host 102 may overwrite the command packet CMD or program/read data for a new transfer request in the dedicated memory regions.

In step S918, the host 102 may perform a shut-down operation. The step S918 may include step S920. To be specific, in step S920, while the host 102 is shut down, the processor 104 may deallocate both the data buffer regions and the metadata regions that are allocated in step S902.

Figure 12A:
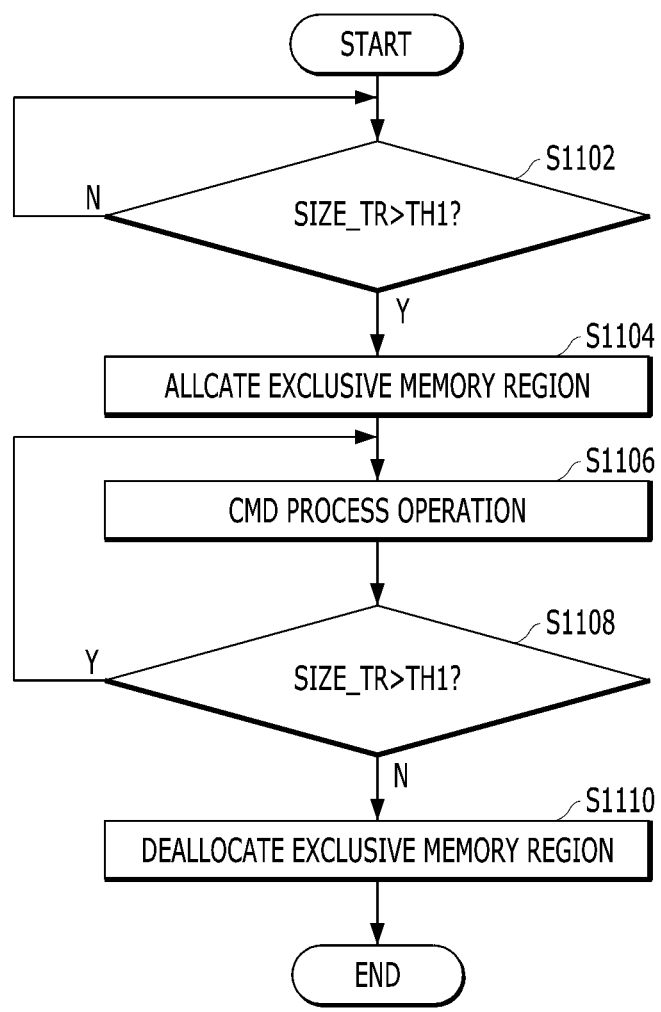
FIG. 12A is a flowchart describing an operation of a data processing system in accordance with another embodiment of the present invention.

FIG. 12A is a flowchart describing an operation of the data processing system 110 in accordance with another embodiment of the present invention.

According to the embodiment of FIG. 12A, when a size of the transfer request stored in the register 302 is greater than a first threshold value, the host 102 may allocate a metadata region and a data buffer region for each of the slots as illustrated earlier with reference to FIG. 9. For example, the size of the transfer request may be a number of the transfer requests stored in the register 302. When the size of the transfer request stored in the register 302 is equal to or less than the first threshold value, the host 102 may deallocate the metadata region(s) and the data buffer region(s).

In step S1102, the processor 104 may compare the size SIZE_TR of the transfer request stored in the register 302 with the first threshold value TH1. When the size SIZE_TR of the transfer request stored in the register 302 is equal to or less than the first threshold value TH1 ('N' in the step S1102), the processor 104 may generate a metadata region and a data buffer region whenever a transfer request is individually generated as described earlier with reference to FIG. 4. When the individual transfer request is processed, the metadata region and the data buffer region may be deallocated.

In step S1104, when the size SIZE_TR of the transfer request stored in the register 302 is greater than the first threshold value TH1 ('Y' in the step S1102), the processor 104 may allocate dedicated memory regions for a plurality of slots coupling the host 102 and the memory system 110 in the memory 106. To be specific, as described above with reference to FIG. 9, the processor 104 may allocate a metadata region corresponding to each of the slots in the memory 106, and allocate a data buffer region corresponding to the metadata region in the memory 106. The processor 104 may generate address information ADDR for the allocated data buffer region and store the address information ADDR for the data buffer region in the metadata region.

In step S1106, the command manager 204 may generate a command packet CMD based on the transfer request, and store the command packet CMD in a corresponding metadata region. The host 102 and the memory system 110 may perform a command processing operation based on the command packet CMD. The command processing operation may be the same as step S916, which is described above with reference to FIG. 9.

In step S1108, the processor 104 may compare the size SIZE_TR of the transfer request stored in the register 302 with the first threshold value TH1. When the size SIZE_TR of the transfer request stored in the register 302 is greater than the first threshold value TH1 ('Y' in step S1108), the host 102 and the memory system 110 may perform the operation of step S1106 by using the dedicated memory regions allocated in step S1104.

In step S1110, when the size SIZE_TR of the transfer request stored in the register 302 is equal to or less than the first threshold value TH1 ('N' in step S1108), the processor 104 may deallocate all the dedicated memory regions allocated in step S1104.

According to another embodiment of the present invention, when there is not enough space in the memory 106 for allocating dedicated memory regions for all the slots coupling the host 102 and the memory system 110, the processor 104 may detect a deterioration of throughput which occurs due to the overhead of the host based on the size of the transfer request, and may increase the throughput of the data processing system 110 in a situation where there are many transfer requests issued in a relatively short period of time, as dedicated memory regions are allocated for all the slots.

Figure 12B:
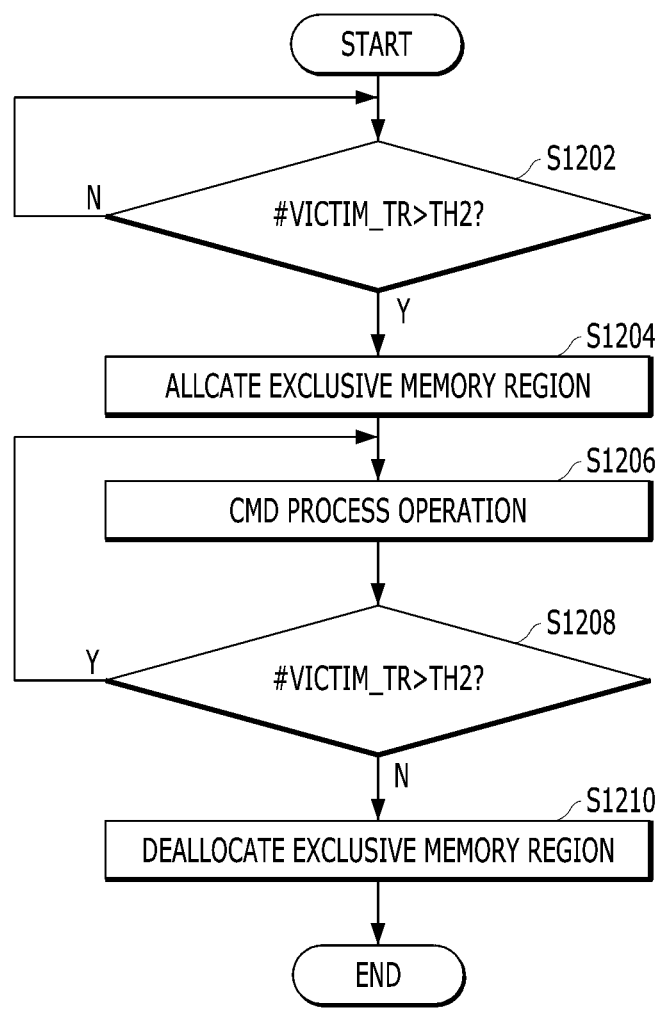
FIG. 12B is a flowchart describing an operation of a data processing system in accordance with another embodiment of the present invention.

FIG. 12B is a flowchart describing an operation of the data processing system 110 in accordance with another embodiment of the present invention.

According to the embodiment of FIG. 12B, when a number of victim transfer requests #VICTIM_TR stored in the register 302 is greater than a second threshold value, the host 102 may allocate a metadata region and a data buffer region for each of the slots as illustrated above with reference to FIG. 9. In this case, a size of the victim transfer request may be smaller than a third threshold value. When the number of the victim transfer requests #VICTIM_TR stored in the register 302 is equal to or less than the second threshold value, the metadata region(s) and the data buffer region(s) may be deallocated.

In step S1202, the processor 104 may compare the number of the victim transfer requests #VICTIM_TR stored in the register 302 with the second threshold value TH2. When the number of the victim transfer requests #VICTIM_TR stored in the register 302 is equal to or less than the second threshold value TH2 ('N' in the step S1202), the processor 104 may allocate a metadata region and a data buffer region whenever an individual transfer request is generated, and when a command for the individual transfer request is processed, the metadata region and the data buffer region may be deallocated.

In step S1204, when the number of the victim transfer requests #VICTIM_TR stored in the register 302 is greater than the second threshold value TH2 ('Y' in the step S1202), the processor 104 may allocate dedicated memory regions for a plurality of slots coupling the host 102 and the memory system 110 in the memory 106. To be specific, as described above with reference to FIG. 9, the processor 104 may allocate a metadata region corresponding to each of the slots in the memory 106, and allocate a data buffer region corresponding to the metadata region in the memory 106. The processor 104 may generate address information ADDR for the allocated data buffer region and store it in the metadata region.

In step S1206, the command manager 204 may generate a command packet CMD based on a transfer request and store the command packet CMD in the corresponding metadata region. The host 102 and the memory system 110 may perform a command processing operation based on the command packet CMD. The command processing operation may be the same as that of step S916, which is described above with reference to FIG. 9.

In step S1208, the processor 104 may compare the number of the victim transfer requests #VICTIM_TR stored in the register 302 with the second threshold value TH2. When the number of the victim transfer requests #VICTIM_TR stored in the register 302 is greater than the second threshold value TH2 ('Y' in step S1208), the host 102 and the memory system 110 may perform the operation of step S1206 by using the dedicated memory regions allocated in the step S1204.

In step S1210, when the number of the victim transfer requests #VICTIM_TR stored in the register 302 is equal to or less than the second threshold value TH2 ('N' in step S1208), the processor 104 may deallocate all the dedicated memory regions allocated in step S1204.

According to another embodiment of the present invention, in case of a victim transfer request having a small size such as the third threshold value, the memory system 110 may perform an operation corresponding to the transfer request more quickly. When the victim requests are accumulated in the register 302 and not quickly outputted to the memory system 110 through the slots, the processor 104 may allocate dedicated memory regions corresponding to the slots so that the victim requests are outputted in parallel. As a result, the throughput of the data processing system 100 may be improved.

According to embodiments of the present invention, a data processing system may improve throughput between a host and a memory system by allocating dedicated memory regions for storing command information in advance and processing data in parallel in use of slots coupling the host and the memory system.

While the present invention has been illustrated and described with respect to specific embodiments, it will be apparent to those skilled in the art in light of the present disclosure that various changes and modifications may be made without departing from the spirit and scope of the invention as defined in the following claims. The present invention encompasses all such changes and modifications that fall within the scope of the claims.

What is claimed is:

1. A method for operating a data processing system including a host and a memory system coupled to each other through a plurality of slots and using a Universal Flash Storage (UFS) interface, the method comprising:
    allocating, by the host, dedicated memory regions respectively corresponding to the slots during a booting operation of the host;
    communicating, between the host and the memory system in parallel through the slots based on command packets and address information for data buffer regions, the command packets and the address information being stored in the dedicated memory regions; and
    deallocating, by the host, the dedicated memory regions during a shutdown of the host.

2. The method of claim 1, wherein the dedicated memory region corresponding to each slot includes a metadata region corresponding to the slot and the data buffer region corresponding to the metadata region.

3. The method of claim 2, wherein the address information is information on physical addresses for the allocated data buffer regions.

4. The method of claim 1, further comprising:
generating and storing in a register, by the host, transfer requests; and
associating, by the host, the slots with the transmission requests.

5. The method of claim 4, wherein the communicating includes:
generating, by the host, the command packets respectively corresponding to the transfer requests; and
storing, by the host, the command packets in corresponding ones among the metadata regions.

6. The method of claim 1, wherein each of the command packets includes information on a kind of a command and a size of target data.

7. The method of claim 6, wherein, when a type of the command is a program command and the target data is program data, the communicating includes:
storing, by the host, the program data in the dedicated memory regions; and
providing, by the host, a command packet corresponding to the command to the memory system.

8. The method of claim 7, wherein the communicating further includes:
providing, by the memory system, a ready to transfer (RTT) signal to the host based on the provided command packet; and
providing, by the host, the program data the memory system in response to the RTT signal.

9. The method of claim 6, wherein, when a type of the command is a read command and the target data is read data, the communicating includes:
providing, by the host, a command packet corresponding to the command to the memory system; and
providing, by the memory system, the read data to the host in response to the provided command packet.

10. The method of claim 9, wherein the communicating further includes storing, by the host, the provided read data in the dedicated memory regions.

11. A method for operating a data processing system including a host and a memory system coupled to each other through a plurality of slots and using a Universal Flash Storage (UFS) interface, the method comprising:
allocating, by the host, dedicated memory regions respectively corresponding to the slots based on sizes of transfer requests stored in a register;
communicating between the host and the memory system in parallel through the slots based on command packets respectively stored in the dedicated memory regions and address information for data buffer regions; and
deallocating, by the host, the dedicated memory regions based on the sizes of the transfer requests.

12. The method of claim 11, wherein the dedicated memory regions are allocated when a sum of the sizes of the transfer requests is greater than a first threshold value.

13. The method of claim 12, wherein the dedicated memory regions are deallocated when the sum of the sizes of the transfer requests is equal to or less than the first threshold value.

14. The method of claim 11, further comprising:
identifying victim transfer requests among the transfer requests,
wherein the dedicated memory regions are allocated when a number of the victim transfer requests is greater than a second threshold value.

15. The method of claim 14, wherein each of the victim transfer requests has a smaller size than a third threshold value.

16. The method of claim 14, wherein the dedicated memory regions are deallocated when the number of the victim transfer requests is equal to or less than the second threshold value.

17. A data processing system using a Universal Flash Storage (UFS) interface, comprising:
a memory system;
a processor configured to allocate metadata regions and data buffer regions respectively corresponding to the metadata regions for a plurality of slots in a booting process, and store address information for the data buffer regions in the corresponding metadata regions;
a command manager configured to generate command packets respectively corresponding to a plurality of transfer requests and store the command packets in corresponding ones among the metadata regions; and
a host controller configured to communicate in parallel with the memory system through the slots based on the command packets and the address information for the data buffer regions,
wherein the memory system and the host controller are coupled to each other through the slots and use the UFS interface.

18. The data processing system of claim 17, wherein the processor deallocates the allocated metadata regions and the allocated data buffer regions during a shutdown process.

19. The data processing system of claim 17,
wherein the host controller provides, when each of the command packets includes a program command, the memory system with the command packets and program data stored in the data buffer regions based on the address information for the data buffer regions, and
wherein the memory system stores the program data in a memory block in response to the command packets.

20. The data processing system of claim 17, wherein the host controller stores, when each of the command packets includes a read command, read data provided from the memory system in the data buffer regions based on the address information for the data buffer regions.

* * * * *